(12) United States Patent
Kusunoki et al.

(10) Patent No.: US 8,642,717 B2
(45) Date of Patent: Feb. 4, 2014

(54) ALIPHATIC POLYESTER RESIN AND A PROCESS FOR PRODUCING IT

(71) Applicant: Toyo Boseki Kabushiki Kaisha, Osaka (JP)

(72) Inventors: Tomokazu Kusunoki, Shiga (JP); Toshifumi Unrinin, Shiga (JP); Osamu Morimoto, Shiga (JP)

(73) Assignee: Toyo Boseki Kabushiki Kaisha, Osaka (JP)

(*) Notice: Subject to any disclaimer, the term of this patent is extended or adjusted under 35 U.S.C. 154(b) by 0 days.

(21) Appl. No.: 13/644,802

(22) Filed: Oct. 4, 2012

(65) Prior Publication Data

US 2013/0041127 A1    Feb. 14, 2013

Related U.S. Application Data

(62) Division of application No. 12/996,892, filed as application No. PCT/JP2009/003399 on Jul. 21, 2009, now abandoned.

(30) Foreign Application Priority Data

Jul. 24, 2008    (JP) .................... 2008-190586

(51) Int. Cl.
   *C08G 63/82*    (2006.01)
   *C08G 79/02*    (2006.01)

(52) U.S. Cl.
   USPC ............ 528/356; 528/287; 528/354; 528/355

(58) Field of Classification Search
   USPC ...................... 528/287, 354, 356, 357
   See application file for complete search history.

(56) References Cited

U.S. PATENT DOCUMENTS

| 2009/0062437 A1 | 3/2009 | Suzuki et al. |
| 2009/0171065 A1 | 7/2009 | Nakamura et al. |

FOREIGN PATENT DOCUMENTS

| JP | 2-175751 | 7/1990 |
| JP | 7-228674 | 8/1995 |
| JP | 8-301993 | 11/1996 |
| JP | 9-31171 | 2/1997 |
| JP | 2000-86877 | 3/2000 |
| JP | 2002-20601 | 1/2002 |
| JP | 2002-322257 | 11/2002 |
| JP | 2003-252972 | 9/2003 |
| JP | 2004-256809 | 9/2004 |
| JP | 2004-277680 | 10/2004 |
| JP | 2005-170989 | 6/2005 |
| WO | 2006/001081 | 1/2006 |
| WO | 2007/094352 | 8/2007 |
| WO | 2007/114459 | 10/2007 |

OTHER PUBLICATIONS

Tchir et al. "Effects of Data Analysis on Accuracy and Precision of GPC Results", 1982.*
International Search Report issued Oct. 27, 2009 in International (PCT) Application No. PCT/JP2009/003399.
Forms PCT/IB/338 and 373 together with English translation of PCT Written Opinion dated Mar. 17, 2011 in PCT/JP2009/003399.

* cited by examiner

*Primary Examiner* — Ling Choi
*Assistant Examiner* — Gennadiy Mesh
(74) *Attorney, Agent, or Firm* — Wenderoth, Lind & Ponack, L.L.P.

(57) ABSTRACT

The present invention is an aliphatic polyester resin in which a polyhydroxy acid skeleton is a main component, manufactured using a polymerization catalyst, characterized in that a specific organophosphorus compound is copolymerized in the resin. Activity of the polymerization catalyst contained in the aliphatic polyester resin of the present invention after the polymerization is well lowered and a lactide is hardly produced even by heating after the polymerization or after the manufacture.

3 Claims, No Drawings

ALIPHATIC POLYESTER RESIN AND A PROCESS FOR PRODUCING IT

TECHNICAL FIELD OF THE INVENTION

The present invention relates to an aliphatic polyester resin where a polyhydroxy acid skeleton is a main component where activity of a polymerization catalyst is lowered by being copolymerized with a specific organophosphorus compound and also to a process for producing the same.

BACKGROUND ART

An aliphatic polyester resin in which a polyhydroxy acid skeleton is a main component comprises a polymer of lactic acid or lactide (polylactic acid) or a copolymer of lactic acid or lactide with other monomer. Since such a resin has a polyhydroxy acid skeleton having an excellent biodegradability, studies for its wide practical use have been briskly carried out in recent years from the viewpoint of environmental problems.

The aliphatic polyester resin in which a polyhydroxy acid skeleton is a main component is usually produced by a process where a lactide which is a dimer of hydroxy acid is melted and mixed under heating together, if desired, with other hydroxy acid, polyol, lactone, etc. and is subjected to a thermal ring-opening polymerization under a nitrogen atmosphere using a known catalyst for ring-opening polymerization. This polymerization catalyst needs to have the activity during the polymerization reaction but, if it still remains in the resin in a state of having the activity even after completion of the polymerization reaction, it partially depolymerizes the resin by heating for removal of unreacted monomer and returns to the starting monomer lactide. The same thing also happens by heating for molding the manufactured resin or for conducting adhesion or coating process using the manufactured resin. When a monomer lactide is present in the resin, the lactide is degraded by moisture in the air to produce an organic acid and the organic acid cleaves the polymer chain whereby the strength of the resin is deteriorated. Accordingly, there has been a demand to lower the activity of the polymerization catalyst in the resin after completion of the polymerization reaction so that production of a monomer lactide by heating after the polymerization or after the manufacture is prevented.

As to a method therefor, there have been proposals where a specific phosphorus compound is added to the reaction system after completion of the polymerization reaction to lower the activity of the polymerization catalyst (Patent Documents 1-3). With regard to the phosphorus compound as such, a phosphoric acid compound or a phosphorous acid compound is used in the Patent Documents 1 and 2 while alkyl phosphate and/or alkyl phosphonate are/is used in the Patent Document 3.

According to the methods of Patent Documents 1 to 3, activity of the polymerization catalyst remained in the resin after completion of the polymerization can be lowered to some extent and production of a monomer lactide by heating after the polymerization or after the manufacture can be prevented to some extent. However, the degree of prevention is insufficient for fully preventing the deterioration of strength of the resin whereby there has been a demand for further improvements.

PRIOR ART DOCUMENTS

Patent Documents

Patent Document 1: Japanese Patent Application Laid-Open (JP-A) No. 228674/95
Patent Document 2: Japanese Patent Application Laid-Open (JP-A) No. 31171/97
Patent Document 3: Japanese Patent Application Laid-Open (JP-A) No. 301993/96

DISCLOSURE OF THE INVENTION

Problem that the Invention is to Solve

The present invention has been achieved in view of the above-mentioned current state of the prior art and its object is to provide an aliphatic polyester resin in which activity of the polymerization catalyst contained in the resin after the polymerization is well lowered and a lactide is hardly produced even by heating after the polymerization or after the manufacture and also to provide a process for producing the same.

Means for Solving the Problem

In order to achieve the above object, the present inventors have searched and investigated a phosphorus compound having an effect of significantly lowering the activity of the polymerization catalyst than before and, as a result, they have found that a specific compound represented by the formula [I] can achieve the above effect whereupon the present invention has been completed.

Thus, the present invention is as shown in the following (1) to (7).

(1) An aliphatic polyester resin in which a polyhydroxy acid skeleton is a main component, manufactured using a polymerization catalyst, characterized in that an organophosphorus compound represented by the formula [I] is copolymerized in the resin.

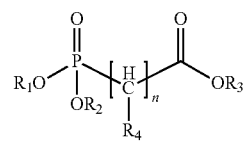

[I]

In the formula, $R_1$, $R_2$, $R_3$ and $R_4$ are same or different and each of them is hydrogen or alkyl group; and n is an integer of 1 or more.

(2) The aliphatic polyester resin according to (1), wherein the polyhydroxy acid is polylactic acid and said polylactic acid is bonded to at least one of $R_1$, $R_2$ and $R_3$ in the organophosphorus compound.

(3) The aliphatic polyester resin according to (2), wherein polylactic acid is bonded to $R_3$ of the organophosphorus compound.

(4) The aliphatic polyester resin according to any of (1) to (3), wherein the molar ratio of phosphorus element (A) derived from the organophosphorus compound to metal element (B) derived from the polymerization catalyst in the resin satisfies the following relation.

$$1 \leq \frac{\text{Phosphorus element } (A) \text{ derived from the organophosphorus compound}}{\text{Metal element } (B) \text{ derived from the polymerization catalyst}} \leq 30$$

(5) An adhesive which is characterized in that the aliphatic polyester resin mentioned in any of (1) to (4) is used.

(6) A process for producing an aliphatic polyester resin where a polyhydroxy acid skeleton is a main component by means of a ring-opening polymerization reaction in the presence of a polymerization catalyst, characterized in that an organophosphorus compound represented by the formula [I] is added to the reaction system to lower the activity of the polymerization catalyst.

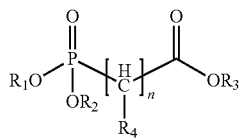

[I]

In the formula, $R_1$, $R_2$, $R_3$ and $R_4$ are same or different and each of them is hydrogen or alkyl group; and n is an integer of 1 or more.

(7) The process according to (6), wherein the organophosphorus compound is added to the reaction system before initiation of the ring-opening polymerization reaction.

Advantages of the Invention

Since the aliphatic polyester resin of the present invention contains a specific organophosphorus compound having better effect for lowering the activity of the polymerization catalyst than the conventional ones, it quite rarely happens that the polymerization catalyst is activated by heating after the polymerization or after the manufacture to produce a monomer lactide in the resin. Accordingly, molded products, coatings and adhesives manufactured using the aliphatic polyester resin of the present invention can show good heat resistance, durability and adhesive property for a long period.

BEST MODE FOR CARRYING OUT THE INVENTION

The aliphatic polyester resin of the present invention is that where a polyhydroxy acid skeleton is a main component. A representative example of the hydroxy acid is lactic acid. Examples of the hydroxy acid (derivative) other than lactic acid include glycolic acid, 2-hydroxyisobutyric acid, 3-hydroxybutyric acid, 16-hydroxyhexadecanoic acid, 2-hydroxy-2-methylbutyric acid, 12-hyroxystearic acid, malic acid, citric acid and gluconic acid. Intermolecular ester of hydroxy acid such as caprolacotne and a cyclic dimer of α-hydroxy acid such as lactide may be used as well. Examples of the aliphatic polycarboxylic acid which can be used as a starting material by adding to lactic acid (lactide) include succinic acid, adipic acid and sebacic acid while examples of polyol component include ethylene glycol, propylene glycol, 1,4-butanediol, 1,6-hexanediol, glycerol and polyglycerol. The aliphatic polyester resin of the present invention is preferred to contain not less than 50% by mass of polyhydroxy skeleton. It is more preferably not less than 70% by mass, still more preferably not less than 80% by mass and, particularly preferably, not less than 90% by mass. When the content of the polyhydroxy acid skeleton is less than the above range, sufficiently good biodegradability, molding property, durability and adhesive property may not be achieved.

The aliphatic polyester resin of the present invention may be produced based on the conventionally known method using a polymerization catalyst. For example, there may adopt a method where lactide which is a dimer of hydroxy acid is mixed by melting with the above-mentioned other hydroxy acid, polyol, lactone, etc. under heating and subjected to a thermal ring-opening polymerization under a nitrogen atmosphere using a known ring-opening polymerization catalyst. A ring-opening polymerization reaction of a lactide is simple in view of its steps and a highly pure product can be apt to be produced thereby.

A process for producing an aliphatic polyester resin according to the present invention is characterized in that an organophosphorus compound represented by the formula [I] is added upon the production for a purpose of reducing the amount of a lactide which is by-produced after the polymerization and after the production. Although there is no particular limitation for the stage where the organophosphorus compound is added, it is preferred for an effective reduction of the amount of the by-produced lactide that the organophosphorus compound is added before the completion of the ring-opening polymerization and it is more preferred to add it before initiation of the ring-opening polymerization.

There is no particular limitation for the polymerization catalyst used in the process for the production of the aliphatic polyester resin of the present invention and examples thereof include conventionally known catalyst suitable for the polymerization of lactic acid such as a tin compound (e.g., tin octylate and dibutyl tin), an aluminum compound (e.g., aluminum acetylacetonate and aluminum acetate), a titan compound (e.g., tetraisopropyl titanate and tetrabutyl titanate), a zirconium compound (e.g., zirconium isoproxide) and an antimony compound (e.g., antimony trioxide).

The optimum amount of the polymerization catalyst may be appropriately adjusted depending upon the type of the catalyst and, when tin octylate is used as a catalyst for example, its amount to 100% by weight of the starting monomer is 0.005 to 0.5% by weight and, preferably, 0.01 to 0.1% by weight. When aluminum acetylacetonate is used as a catalyst, its amount to 100% by weight of the starting monomer is 0.01 to 0.8% by weight and, preferably, 0.01 to 0.1% by weight. When the starting monomer is subjected to a thermal polymerization reaction in the presence of a catalyst usually for 0.5 to 10 hour(s), the aliphatic polyester resin of the present invention can be produced. It is preferred that the reaction is carried out in an atmosphere or a stream of inert gas such as nitrogen. After completion of the polymerization reaction, the reaction system is vacuated if necessary so that the unreacted monomer is evaporated. Temperature for the evaporating step is usually 150 to 200° C., pressure therefor is usually 0.05 to 10 Torr and time therefor is usually 0.2 to 2 hour(s).

In a process for the production of the aliphatic polyester resin of the present invention, an initiator for the ring-opening polymerization of a lactide may be used. There is no particular limitation for the ring-opening polymerization initiator and it may be any of aliphatic mono- or dihydric alcohol or polyhydric alcohol and, further, it may be saturated or unsaturated. To be more specific, there may be used a monohydric alcohol such as methanol, ethanol, propanol, butanol, pentanol, hexanol, heptanol, nonanol, decanol, lauryl alcohol, myristyl alcohol, cetyl alcohol or stearyl alcohol; a dihydric alcohol such as ethylene glycol, 1,2-propanediol, 1,3-propanediol, 1,3-butanediol, 1,4-butanediol, hexanediol, nonanediol or tetramethylene glycol; a polyhydric alcohol such as glycerol, polyglycerol, sorbitol, xylitol, ribitol or erythritol; and methyl lactate, ethyl lactate, etc. Among them, it is particularly preferred to use ethylene glycol, lauryl alcohol, glycerol or polyglycerol. When boiling point of the alcohol used is lower than the polymerization temperature, it is necessary to conduct the reaction under pressurization. Amount of the alcohol may vary depending upon the object and, when it is too much, there is a tendency that the molecular weight hardly increases. Preferably, it is used in an amount of 0.01 to 1 molar % to 100 molar % of the total monomer amount.

The organophosphorus compound used in the process for production of the aliphatic polyester resin of the present invention is represented by the following formula [I]

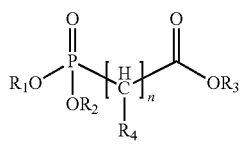

In the formula, $R_1$, $R_2$, $R_3$ and $R_4$ are same or different and each of them is hydrogen or alkyl group; and n is an integer of 1 or more. Particularly when the rate of hydrogen in $R_1$, $R_2$ and $R_3$ becomes high, the activity of the polymerization catalyst lowers and, therefore, there is a tendency that, when the above organophosphorus compound is added before the ring-opening polymerization or during the initial stage of the ring-opening polymerization, an insufficient polymerization happens and the molecular weight hardly increases. Accordingly, in the production of the aliphatic polyester resin of the present invention, it is preferred that the organophosphorus compound is selected depending upon the adding stage of the organophosphorus compound.

Type of the preferred organophosphorus compound varies depending upon the adding stage and, when it is a stage where the weight average molecular weight of the reaction product is not more than 10,000, rate of hydrogen in $R_1$, $R_2$ and $R_3$ of the organophosphorus compound is preferred to be small and it is particularly preferred that hydrogen is 1 or less. If the organophosphorus compound is added after the ring-opening polymerization finishes, it is preferred in view of reduction of the by-produced lactide that the rate of hydrogen in $R_1$, $R_2$ and $R_3$ of the organophosphorus compound is many and it is acceptable all of them are hydrogen. Adding amount of the organophosphorus compound is preferred to be 0.5 to 30 times mole to the amount of the catalyst used for the polymerization and 0.5 to 10 times mole is particularly preferred. When the amount is less than the above range, an effect of reducing the lactide is sometimes difficult while, even when more amount than the above range is added, there is a tendency that no difference is noted in the effect.

There is no particular limitation for the method of adding the organophosphorus compound to the reaction system. It may be added together with the starting monomer or may be added after dissolution of the starting monomer by rising the temperature of the reaction solution. Of course, it is also possible to add during the polymerization reaction or after completion of the reaction. Among them, it is preferred that the organophosphorus compound is added immediately after dissolution of the starting monomer or, in other words, before the ring-opening polymerization starts. The reason therefor is that the starting monomer, the organophosphorus compound and the catalyst can be mixed quickly whereby the polymerization efficiency can be made high and, at the same time, control of the ultimate molecular weight becomes easier.

As to the organophosphorus compound represented by the formula [I], it is preferred that $R_4$ is hydrogen as shown in the following formula [II] in view of enhancing the reaction efficiency.

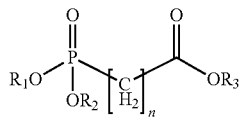

In the formula, $R_1$, $R_2$, and $R_3$ are same or different and each of them is hydrogen or alkyl group; and n is an integer of 1 or more.

Examples of the above-mentioned organophosphorus compound include the followings. Thus, as to the compound where all of $R_1$, $R_2$ and $R_3$ are alkyl groups, examples thereof include methyl dimethoxyphosphinylacetate, ethyl diethoxyphosphinylacetate, ethyl 2-(diethoxyphosphinyl)-propanoate and ethyl 3-(diethoxyphosphinyl)propanoate. Examples of the compound where only any of $R_1$ and $R_2$ is hydrogen while $R_3$ is an alkyl group include methyl methoxyphosphinylacetate, ethyl ethoxyphosphinylacetate, ethyl 2-(ethoxyphosphinyl)propanoate and ethyl 3-(ethoxyphosphinyl)propanoate. Examples of the compound where both $R_1$ and $R_2$ are hydrogens while $R_3$ is an alkyl group in $R_1$, $R_2$ and $R_3$ include methyl phosphonoacetate, ethyl phosphonoacetate, ethyl 2-phosphonopropanoate and ethyl 3-phosphonopropanoate. Examples of the compound where all of $R_1$, $R_2$ and $R_3$ are hydrogens in $R_1$, $R_2$ and $R_3$ include phosphonoacetic acid, 2-phosphonopropanoic acid and 3-phosphonopropanoic acid. The organophosphorus compound as such may be added to the polymerization reaction system after dissolving in an organic solvent. The solvent used therefor may be the same as or different from the ring-opening reaction initiator and its examples include methanol, ethanol, propanol, xylene, toluene, ethylene glycol and lauryl alcohol.

The aliphatic polyester resin of the present invention is characterized in that an organophosphorus compound represented by the formula [I] is copolymerized in the resin and there is no particular limitation for the bonding mode thereof. It is mentioned hereinabove already that, at that time, the polyhydroxy acid which is the main component is preferred to be polylactic acid. However, when the efficiency, etc. of the polymerization step are taken into consideration, it is preferred that the polylactic acid segment is bonded to at least one of $R_1$, $R_2$ and $R_3$ of the organophosphorus compound or, particularly, to $R_3$ of the organophosphorus compound. Although there is no particular limitation for the bonding mode, it is preferred that the terminal hydroxyl group of the polylactic acid segment is bonded as an ester bond as a result of the reaction with the site of carboxyl group or phosphoric acid group to which $R_1$, $R_2$ and $R_3$ are bonded.

When the aliphatic polyester resin of the present invention was searched and investigated by means of nuclear magnetic resonance spectral analysis and ICP emission analysis, it was found that the aliphatic polyester resin of the present invention lowers the activity of the polymerization catalyst as a result of formation of a complex of the organophosphorus compound of the formula [I] with the polymerization catalyst and suppresses the by-production of a monomer lactide by heating after the polymerization or after the manufacture. In the polyester resin of the present invention, the organophosphorus compound is copolymerized whereby evaporation of the organophosphorus compound by heating upon the ring-opening polymerization and evaporation of the organophosphorus compound in the evaporating step in vacuo of the unreacted monomer conducted after completion of the ring-opening reaction are little as compared with the case of a mere blend in the prior art. Therefore, the organophosphorus compound added efficiently lowers the activity of the polymerization catalyst whereupon the by-production of a lactide can be suppressed. To be more specific, the site where $R_1$, $R_2$ and/or $R_3$ in the organophosphorus compound represented by the formula [I] are/is hydrogen interacts on the polymerization catalyst to lower the activity of the catalyst and, as a result, by-production of a lactide after the polymerization is suppressed and, further, production of a lactide upon a heating process of the resulting aliphatic polyester resin such as molding, adhesion and coating can also be suppressed. Furthermore, when many of the copolymerized organophosphorus compound has such a structure that the $R_3$ moiety sequesters the terminal of the aliphatic polyester as shown in the formula [III], production of a lactide by a backbiting reaction of the aliphatic polyester resin is suppressed and by-production of a lactide by the backbiting reaction upon the heating process of the resulting aliphatic polyester resin such as molding, adhesion or coating can also be suppressed. It is likely that, when the organophosphorus compound represented by the formula [I] is added to the reaction system before the ring-opening polymerization, during the ring-opening polymerization or after the ring-opening polymerization, any of the sites of $R_1$, $R_2$ and $R_3$ is bonded to hydroxyl group of polylactic acid segment to copolymerize. When the compound where any of $R_1$, $R_2$ and $R_3$ is an alkyl group is used, it is preferred in view of suppression of production of a lactide that the alkyl group of at least one of $R_1$, $R_2$ and $R_3$ which is not bonded the polylactic acid segment is detached to give hydrogen.

As to a preferred structure of the aliphatic polyester resin of the present invention, that where polylactic acid segment is bonded to $R_3$ of the formula [I] may be cited and it can be expressed, for example, by the following formula [III].

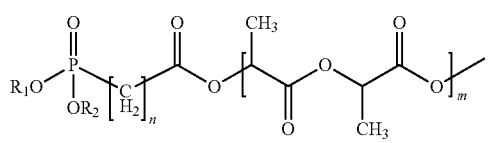

In the formula, $R_1$ and $R_2$ are hydrogen or alkyl group; and n is an integer of 1 or more; and m is an integer of 3 or more.

It is a matter of course that the aliphatic polyester resin of the present invention may include a substance where all of $R_1$, $R_2$ and $R_3$ in the formula [I] are substituted with a polylactic acid segment but, in such a structure, there is no site for conducting the interaction for lowering the activity of the polymerization catalyst whereby there is a tendency that an effect of suppressing the by-production of a lactide becomes little. Therefore, it is preferred that at least one of $R_1$, $R_2$ and $R_3$ is a polylactic acid segment while others are hydrogen or alkyl group and it is more preferred that $R_3$ is a polylactic acid segment while others are hydrogen or alkyl group. It is particularly preferred that $R_1$, $R_2$ and $R_3$ which are not polylactic acid segment are hydrogen.

In the aliphatic polyester resin of the present invention, the molar ratio of the phosphorus element (A) derived from the organophosphorus compound in the resin to the metal element (B) derived from the polymerization catalyst is preferred to satisfy the relation of $1 \leq (A)/(B) \leq 30$ and is particularly preferred to satisfy the relation of $3 \leq (A)/(B) \leq 9$.

When (A)/(B) is more than the above range, there may be the case where the hue of the resin becomes bad due to the thermally decomposed organophosphorus compound or there may be the case where polyester resin of targeted molecular weight can not be produced in the production of the aliphatic polyester resin of the present invention by addition of the organophosphorus compound before the ring-opening polymerization. There may also the case where, when used as an adhesive or a coating material, close adhesion to the base material is not sufficiently achieved or the reaction with a hardener does not sufficiently take place. On the other hand, when (A)/(B) is less than the above range, there may be the case where the amount of the polymerization catalyst which lowers its activity by the organophosphorus compound copolymerized in the aliphatic polyester resin becomes small whereby by-production of a lactide after polymerization can not be well suppressed and, as a result, the amount of the lactide remained in the aliphatic polyester rein can not be well reduced. Further, there is also a possibility that the production of the lactide upon a heating process such as molding, adhesion or coating using such a resin can not be suppressed.

The polymerization temperature in the production of the aliphatic polyester resin of the present invention is preferred to be a temperature by which the starting monomer can be dissolved and which is lower than the boiling point of the organophosphorus compound to be added. When polymerization is carried out at the temperature which is higher than the boiling point of the organophosphorus compound, there may be the case where the organophosphorus compound is evaporated during the reaction whereby the activity of the catalyst can not be lowered and the amount of the remained lactide can not be lowered even if a condenser is equipped therewith. When the polymerization temperature is high, changes in the structure of the organophosphorus compound are quick and the activity of the polymerization catalyst can be lowered within short time but racemization of the lactide also proceeds whereby the polymerization temperature is preferred to be not higher than 230° C. It is particularly preferred that the polymerization temperature is within a range of 100 to 230° C.

If necessary, the aliphatic polyester resin of the present invention may contain various kinds of additives such as antioxidant, thermostabilizer, ultraviolet absorber, lubricant, tackifier, plasticizer, cross-linking agent, viscosity-adjusting agent, antistatic agent, perfume, antibacterial agent, dispersing agent and polymerization inhibitor within such an extent that the object of the present invention is not deteriorated thereby.

The aliphatic polyester resin of the present invention can be used in the conventionally known areas such as molding materials, films, fibers, adhesives, coating agents, paint binders or ink binders. Particularly when used as adhesives, the adhesive strength hardly lowers even when stored for a long period at high temperature and under high humidity since the amount of the lactide in the resin is small.

EXAMPLES

Examples of the present invention will be shown below for showing the effect of the invention although the present invention is not limited thereto. Incidentally, the characteristic values in the Examples were measured by the following methods.

(1) The Weight-Average Molecular Weight of the Resin

GPC of the synthesized polylactic acid resin was measured using liquid chromatograph (Prominence manufactured by Shimadzu) where tetrahydrofuran was a mobile phase, column temperature was 30° C. and flow rate was 1 mL/minute. The value calculated from the result followed by converting into polystyrene was adopted as the weight-average molecular weight of the resin. Shodex KF-802, 804 and 806 manufactured by Showa Denko KK were used as the columns.

(2) Amount of By-Produced Lactide after the Polymerization

The synthesized polylactic acid resin was dissolved in chloroform-d and, using the resulting solution, integral value of proton derived from polylactic acid and integral value of proton derived from lactide were measured by a nuclear magnetic resonance spectrum (NMR) apparatus of 400 MHz. Amount of by-produced lactide after the polymerization was calculated from the ratio of them.

(3) Amount of the Copolymerized Organophosphorus Compound

The synthesized polylactic acid resin (40 mg) was dissolved in 0.6 ml of a mixed solvent of chloroform-d with DMSO-d (1:1 by volume), then 5 µl of phosphoric acid was added thereto and the mixture was allowed to stand at room temperature for 1 hour and subjected to a $^1$H-NMR measurement using a nuclear magnetic resonance (NMR) apparatus of 500 MHz.

From the comparison of the integral ratio of the peak derived from the organophosphorus compound with the integral ratio of the peak derived from the polylactic acid based on the result of $^1$H-NMR, there was divided into an organophosphorus compound where a polylactic acid segment was bonded to $R_3$ while $R_1$ and $R_2$ were unchanged from the structure before addition in the formula [I] and an organophosphorus compound where all of $R_1$, $R_2$ and $R_3$ in the formula [I] were unchanged from the structure before addition in the formula [I] whereby the amount of organophosphorus compound was calculated.

Further, the synthesized polylactic acid resin (500 mg) was dissolved in 2.5 ml of a mixed solvent of chloroform-d with DMSO-d (1:1 by volume), about 80 mg of phosphoric acid was added thereto and the mixture was allowed to stand at room temperature for 1 hour and was subjected to the measurement of $^{31}$P-NMR using a nuclear magnetic resonance spectrum (NMR) apparatus of 500 MHz. From the result of the $^{31}$P-NMR, the presence of the organophosphorus compound which was not noted for its peak in $^1$H-NMR was now clear.

From the amount of the organophosphorus compound previously calculated from the $^1$H-NMR measurement and the result of the $^{31}$P-NMR measurement, amount of the organophosphorus compound copolymerized to polylactic acid among the organophosphorus compounds contained in polylactic acid was calculated.

The calculated amount of the copolymerized organophosphorus compound (mol %) expresses the amount to the lactide constituting the polylactic acid.

(4) Amount of Phosphorus Element and Amount of the Metal Element Derived from the Polymerization Catalyst To 0.2 g of the synthesized polylactic acid was added 3 mL of nitric acid and a solution for measurement was prepared by a tightly-closed high-pressure wet digestion method. From the solution to be measured, amount of phosphorus element and amount of the metal element derived from the polymerization catalyst were quantified by an ICP emission method.

(5) The Bonding Strength as Heat-Seal Adhesive

The synthesized polylactic acid resin was dissolved in ethyl acetate so as to make the solid concentration 40%. The resulting solution was applied on a biaxially elongated polylactic acid film and the solvent was removed by drying in vacuo for one night at 35° C. to prepare two sheets of coated film. The applied sides of the resulting two coated films were contacted and subjected to a heat laminate adhesion at 100° C. and 3 kgf/cm$^2$ to prepare a sample for a peeling test. Two test pieces in 10-mm width were cut out from this sample. One test piece was immediately (on the zero-th day) subjected to a bonding strength test. Another test piece was allowed to stand for 20 days under the condition of 40° C. and 85% RH and the bonding strength on the 20th day was measured. The bonding strength was measured by subjecting the test piece to a T peeling test at a tensile speed of 10 mm/minute using a tensile testing machine.

Example 1

As the starting monomers, 400 g of L-lactide and 100 g of D-lactide were placed in a two-liter reactor made of SUS 304 equipped with a stirrer, a thermometer and an inlet for blowing nitrogen thereinto, then the starting monomers were melted at 120° C. together with stirring under a nitrogen atmosphere and 0.14 g of tin octylate, 0.5 g of ethylene glycol as a ring-opening polymerization initiator and 0.22 g of ethyl diethoxyphosphinylacetate as an organophosphorus compound were added thereto. After that, the reaction system was heated up to 180° C. and the polymerization was conducted for 1.5 hours. After completion of the polymerization reaction, the unreacted monomers were removed in vacuo (0.1 Torr) at 180° C. for 0.5 hour to synthesize the polylactic acid resin. Details of the production method for the resin and physical properties of the resulting resin are shown in Table 1.

Example 2

The same operation as in Example 1 was carried out except that the amount of ethyl diethoxyphosphinylacetate was made 0.66 g to synthesize a polylactic acid resin. Details of the production method for the resin and physical properties of the resulting resin are shown in Table 1.

Example 3

The same operation as in Example 1 was carried out except that the amount of ethyl diethoxyphosphinylacetate was made 1.98 g to synthesize a polylactic acid resin. Details of the production method for the resin and physical properties of the resulting resin are shown in Table 1.

Example 4

The same operation as in Example 1 was carried out except that 0.22 g of ethyl diethoxyphosphinylacetate was made 0.54 g of methyl dimethoxyphosphinylacetate to synthesize a polylactic acid resin. Details of the production method for the resin and physical properties of the resulting resin are shown in Table 1.

Example 5

The same operation as in Example 1 was carried out except that 0.22 g of ethyl diethoxyphosphinylacetate was made 0.71 g of ethyl 2-(diethoxyphosphinyl)-propanoate to synthesize a polylactic acid resin. Details of the production method for the resin and physical properties of the resulting resin are shown in Table 1.

Example 6

The same operation as in Example 1 was carried out except that 0.22 g of ethyl diethoxyphosphinylacetate was made 0.70 g of ethyl 3-(diethoxyphosphinyl)propanoate to synthesize a polylactic acid resin. Details of the production method for the resin and physical properties of the resulting resin are shown in Table 1.

Example 7

As the starting monomers, 400 g of L-lactide and 100 g of D-lactide were placed in a two-liter reactor made of SUS 304 equipped with a stirrer, a thermometer and an inlet for blowing nitrogen thereinto, then the starting monomers were melted at 120° C. together with stirring under a nitrogen atmosphere and 0.14 g of tin octylate and 0.5 g of ethylene glycol as a ring-opening polymerization initiator were added thereto. After that, the reaction system was heated up to 180° C. and the polymerization was conducted for 1.5 hours. After completion of the polymerization reaction, 0.66 g of ethyl diethoxyphosphinylacetate as an organophosphorus compound was added thereto and stirred for 30 minutes. After that, the unreacted monomers were removed in vacuo (0.1 Torr) at 180° C. for 0.5 hour to synthesize the polylactic acid resin. Details of the production method for the resin and physical properties of the resulting resin are shown in Table 1.

Comparative Example 1

As the starting monomers, 400 g of L-lactide and 100 g of D-lactide were placed in a two-liter reactor made of SUS 304 equipped with a stirrer, a thermometer and an inlet for blowing nitrogen thereinto, then the starting monomers were melted at 120° C. together with stirring under a nitrogen atmosphere and 0.14 g of tin octylate and 0.5 g of ethylene glycol as a ring-opening polymerization initiator were added thereto. After that, the reaction system was heated up to 180° C. and the polymerization was conducted for 1.5 hours. After completion of the polymerization reaction, the unreacted monomers were removed in vacuo (0.1 Torr) at 180° C. for 0.5 hour to synthesize the polylactic acid resin. Details of the production method for the resin and physical properties of the resulting resin are shown in Table 1.

Comparative Example 2

As the starting monomers, 400 g of L-lactide and 100 g of D-lactide were placed in a two-liter reactor made of SUS 304 equipped with a stirrer, a thermometer and an inlet for blowing nitrogen thereinto, then the starting monomers were melted at 120° C. together with stirring under a nitrogen atmosphere and 0.14 g of tin octylate, 0.5 g of ethylene glycol as a ring-opening polymerization initiator and 0.28 g of trimethyl phosphate as an organophosphorus compound were added thereto. After that, the reaction system was heated up to 180° C. and the polymerization was conducted for 1.5 hours. After completion of the polymerization reaction, the unreacted monomers were removed in vacuo (0.1 Torr) at 180° C. for 0.5 hour to synthesize the polylactic acid resin. Details of the production method for the resin and physical properties of the resulting resin are shown in Table 1.

Comparative Example 3

The same operation as in Comparative Example 2 was carried out except that 0.28 g of trimethyl phosphate was made 0.38 g of triethyl phosphate to synthesize a polylactic acid resin. Details of the production method for the resin and physical properties of the resulting resin are shown in Table 1.

Comparative Example 4

The same operation as in Comparative Example 2 was carried out except that 0.28 g of trimethyl phosphate was made 0.38 g of dimethyl phenyl phosphonate to synthesize a polylactic acid resin. Details of the production method for the resin and physical properties of the resulting resin are shown in Table 1.

Comparative Example 5

As the starting monomers, 400 g of L-lactide and 100 g of D-lactide were placed in a two-liter reactor made of SUS 304 equipped with a stirrer, a thermometer and an inlet for blowing nitrogen thereinto, then the starting monomers were melted at 120° C. together with stirring under a nitrogen atmosphere and 0.14 g of tin octylate and 0.5 g of ethylene glycol as a ring-opening polymerization initiator were added thereto. After that, the reaction system was heated up to 180° C. and the polymerization was conducted for 1.5 hours. After completion of the polymerization reaction, 0.28 g of trimethyl phosphate as an organophosphorus compound was added thereto and stirred for 30 minutes. After that, the unreacted monomers were removed in vacuo (0.1 Torr) at 180° C. for 0.5 hour to synthesize the polylactic acid resin. Details of the production method for the resin and physical properties of the resulting resin are shown in Table 1.

TABLE 1

| | Type of organophosphorus compound | Adding stage of the organophosphorus compound | Amount of the copolymerized organophosphorus compound (mol %)* | Amount of elements in the resin (ppm) | |
|---|---|---|---|---|---|
| | | | | Tin | Phosphorus |
| Example 1 | Ethyl diethoxyphosphinylacetate | Before polymerization | 0.020 | 83 | 45 |
| Example 2 | Ethyl diethoxyphosphinylacetate | Before polymerization | 0.050 | 83 | 150 |
| Example 3 | Ethyl diethoxyphosphinylacetate | Before polymerization | 0.173 | 83 | 420 |
| Example 4 | Methyl dimethoxyphosphinylacetate | Before polymerization | 0.048 | 83 | 140 |
| Example 5 | Ethyl 2-(diethoxyphosphinyl)-propanoate | Before polymerization | 0.046 | 83 | 160 |
| Example 6 | Ethyl 3-(diethoxyphosphinyl)propanoate | Before polymerization | 0.048 | 83 | 150 |
| Example 7 | Ethyl diethoxyphosphinylacetate | After polymerization | 0.045 | 83 | 140 |
| Comparative Example 1 | — | — | 0 | 83 | 0 |
| Comparative | Trimethyl phosphate | Before | 0 | 83 | 35 |

TABLE 1-continued

| | | | | | |
|---|---|---|---|---|---|
| Example 2 | | polymerization | | | |
| Comparative Example 3 | Triethyl phosphate | Before polymerization | 0 | 83 | 40 |
| Comparative Example 4 | Dimethyl phenyl phosphonate | Before polymerization | 0 | 83 | 40 |
| Comparative Example 5 | Trimethyl phosphate | After polymerization | 0 | 83 | 28 |

| | phosphorus/Tin in the resin (molar ratio) | Weight average molecular weight of the resin (Mw) | Amount of by-produced lactide after polymerization (wt %) | Adhesive strength (g/cm) | |
|---|---|---|---|---|---|
| | | | | Zero-th day | 20th day |
| Example 1 | 2.1 | 84760 | 1.5 | 150 | 150 |
| Example 2 | 6.9 | 86230 | 1.5 | 160 | 155 |
| Example 3 | 19.4 | 85520 | 1.5 | 150 | 140 |
| Example 4 | 6.5 | 84980 | 1.5 | 150 | 150 |
| Example 5 | 7.4 | 85520 | 1.5 | 150 | 140 |
| Example 6 | 6.9 | 84980 | 1.5 | 150 | 150 |
| Example 7 | 6.5 | 85550 | 2.0 | 155 | 140 |
| Comparative Example 1 | 0.0 | 83310 | 5.5 | 160 | 80 |
| Comparative Example 2 | 1.6 | 85420 | 3.5 | 150 | 80 |
| Comparative Example 3 | 1.8 | 82350 | 3.5 | 150 | 70 |
| Comparative Example 4 | 1.8 | 84420 | 3.5 | 155 | 80 |
| Comparative Example 5 | 1.3 | 85420 | 5.0 | 150 | 80 |

*means amount of organophosphorus compound to lactide unit.

It will be apparent from Table 1 that, in all of the polylactic acid resins of Examples 1 to 7 where the organophosphorus compound represented by the formula [I] were copolymerized in the resin, the by-produced amount of a lactide after the polymerization was small and a decrease in the bonding strength after storing for a long period (20 days) was small. On the contrary, in the polylactic acid resin of Comparative Example 1 where the organophosphorus compound was not copolymerized in the resin and in all of the polylactic acid resins of Comparative Examples 2 to 5 where the organophosphorus compound which was different from that represented by the formula [I] was copolymerized in the resin, the by-produced amount of a lactide after the polymerization was large and a decrease in the bonding strength after storing for a long period (20 days) was also large. From those results, it is clear that, when the specific organophosphorus compound represented by the formula [I] is copolymerized in the resin, the activity of the polymerization catalyst remained in the resin after completion of the polymerization reaction can be well lowered and accordingly that production of a lactide by heating after the polymerization or after the manufacture and deterioration in the resin strength can be prevented.

Industrial Applicability

The aliphatic polyester resin of the present invention quite rarely happens that the polymerization catalyst is activated by heating after the polymerization or after the manufacture to produce a monomer lactide in the resin. Therefore, molded products, coatings and adhesives manufactured using the aliphatic polyester resin of the present invention can show good heat resistance, durability and adhesive property for a long period.

The invention claimed is:

1. A process for producing an aliphatic polyester resin where a polyhydroxy acid skeleton is a main component, which comprises subjecting starting monomers to a ring-opening polymerization reaction in the presence of a polymerization catalyst, wherein an organophosphorus compound represented by the formula is added to the reaction system to lower the activity of the polymerization catalyst

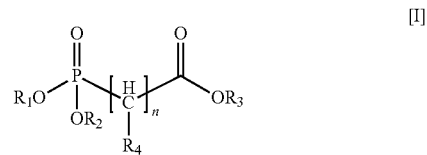

[I]

wherein in the formula, $R_1$, $R_2$, $R_3$ and $R_4$ are same or different and each is hydrogen or alkyl group; and n is an integer of 1 or more, wherein the organophosphorus compound is added to the reaction system before initiation of the ring-opening polymerization reaction and compound to metal element (B) derived from the polymerization catalyst in the resin satisfies the following relation $$1 \leq \frac{\text{Phosphorus element }(A)\text{ derived from the organophosphorus compound}}{\text{Metal element }(B)\text{ derived from the polymerization catalyst}} \leq 30.$$

2. The process according to claim 1, wherein the polyhydroxy acid is polylactic acid and said polylactic acid is bonded to at least one oxygen of ester groups by replacing the $R_1$, $R_2$ and $R_3$ in the organophosphorus compound.

3. The process according to claim 2, wherein polylactic acid bonded to the oxygen of ester groups by replacing the $R_3$ of the organophosphorus compound.

* * * * *